United States Patent [19]

Melocik

[11] 4,206,829

[45] Jun. 10, 1980

[54] CONTROL SYSTEM FOR LIFT TRUCKS OR THE LIKE

[75] Inventor: Grant C. Melocik, Chardon, Ohio

[73] Assignee: Towmotor Corporation, Mentor, Ohio

[21] Appl. No.: 754,812

[22] Filed: Dec. 27, 1976

[51] Int. Cl.[2] .............................................. B60R 21/00

[52] U.S. Cl. ...................................... 180/290; 414/21; 414/631; 340/53; 340/540; 340/331

[58] Field of Search ............ 180/100, 99, 104, 103 R, 180/105 E, 105 R, 82 R; 214/673, 674; 340/52 R, 52 D, 53, 62, 72, 248 D, 263, 331

[56] References Cited

U.S. PATENT DOCUMENTS

| | | | |
|---|---|---|---|
| 2,707,760 | 5/1955 | Sherman | 340/248 D X |
| 2,868,919 | 1/1959 | Harvey | 200/85 |
| 2,935,161 | 5/1960 | Comfort | 187/9 |
| 3,032,221 | 5/1962 | Carliss | 214/673 |
| 3,106,981 | 10/1963 | Chakiris | 180/99 |
| 3,203,672 | 8/1965 | Santos | 214/673 X |
| 3,520,380 | 7/1970 | Radin | 180/110 |
| 3,528,056 | 9/1970 | Voevodsky | 340/72 |
| 3,710,315 | 1/1973 | Scherenberg | 340/62 |
| 3,771,122 | 11/1973 | Sattler | 340/263 X |
| 3,832,629 | 8/1974 | Cernek | 340/248 D X |
| 3,840,276 | 10/1974 | Jubenville | 180/103 BF |
| 3,901,121 | 8/1975 | Kleiner | 340/331 X |
| 3,983,462 | 9/1976 | Jones | 318/139 |
| 4,003,487 | 1/1977 | Downing | 214/673 |
| 4,093,091 | 6/1978 | Gregg | 214/673 |

FOREIGN PATENT DOCUMENTS

| | | |
|---|---|---|
| 1577052 | 6/1969 | France . |
| 856939 | 12/1960 | United Kingdom . |
| 1385099 | 2/1975 | United Kingdom . |

*Primary Examiner*—John P. Silverstrim

*Attorney, Agent, or Firm*—Wegner, Stellman, McCord, Wiles & Wood

[57] ABSTRACT

A control system for a work-performing vehicle such as a lift truck, front end loader, or the like, including a source of motive power for driving the vehicle, performing work, or the like, and of the type including a sensor having an electrical output providing an electrical output signal having a characteristic whose magnitude varies according to load distribution on the vehicle. A level detector receives the output signal and provides a further signal, in response thereto, indicative of an unstable load distribution on the vehicle and there is a circuit connected to the output of the level detector responsive to the signal therefrom for disabling the motive power source when the load distribution on the vehicle is unstable to prevent an intensification of the unstable condition. The system includes an additional level detector receiving the output signal from the sensor for providing a further signal indicative that the unstable load distribution condition on the vehicle is being approached, which signal is issued prior to the signal from the first-mentioned level detector. The signal from the additional level detector may be utilized to issue an audible or visual warning, retard the speed of the vehicle, or retard the speed of a work-performing device, all prior to disabling of the motive power source.

6 Claims, 3 Drawing Figures

CONTROL SYSTEM FOR LIFT TRUCKS OR THE LIKE

BACKGROUND OF THE INVENTION

This invention relates to control systems for work-performing vehicles such as lift trucks, front end loaders, or the like, wherein the vehicle may move across the underlying terrain and wherein the same includes a load handling device or the like relatively movable on the vehicle frame. Typically, but not always, the load handling device will undergo compound movement relative to the vehicle frame.

Prior art of possible relevance includes commonly assigned U.S. Pat. No. 3,983,462, issued Sept. 28, 1976 to Jones; commonly assigned U.S. Pat. No. 4,093,091 issued June 6, 1978 (now U.S. Pat. No. 4,093,091), entitled "Load Moment Sensing System For Lift Trucks", in the name of Gregg et al; and United Kingdom specification No. 1,385,099 to Coventry Climax Engines Ltd., published Feb. 6, 1975.

Lift trucks and front end loaders have greatly increased in popularity due to their maneuvering ability and load carrying capacity. As is well known, such vehicles include lift arms or a mast on the front end of the vehicle which carry a load handling means. In the case of lift trucks, the mast is pivoted to the vehicle and a carriage in the form of a fork or the like is mounted for reciprocatory movement on the mast. In the case of front end loaders, buckets typically are pivoted on the lift arms and are movable with respect thereto.

Because the load is carried forwardly of the center of gravity of the vehicle, increased loading on the carriage or bucket increases the tendency of the vehicle to become overloaded in its forward direction.

Various means have been provided for warning the operator of such a vehicle of an overload condition and/or for varying the operation of the vehicle to preclude an overload condition from occurring. For example, in the system of the above-identified Gregg et al application, when a predetermined overload condition is sensed, certain functions are disabled, preventing the intensification of the overload condition. In other cases, when the predetermined overload condition is sensed, an audible or visual warning will be adduced at the time to warn the operator that the overload condition should not be intensified.

The Gregg et al system works extremely well for its intended purpose in preventing an overload condition from occurring. However, since it shuts down certain of the functions of the vehicle when an overload condition is sensed, it is necessary that the overload condition first be relieved before full use of the vehicle may be resumed.

In the case of those systems providing only an audible or visual warning, such occur only at the time the overload condition is detected and if the vehicles are being controlled by an unmindful operator, the overload condition may be aggravated.

SUMMARY OF THE INVENTION

It is the principal object of the invention to provide a new and improved control system for work performing vehicles such as lift trucks, front end loaders, or the like. More specifically, it is an object of the invention to provide such a system wherein at least certain of the functions of the vehicle which would aggravate an overload condition are disabled when an overload condition is sensed and wherein a perceptible indication is given to the operator of the vehicle prior to the occurrence of an overload condition so that action may be taken to avoid an overload condition coming into existence to thereby avoid the need for relieving an overload condition after the vehicle has been partially or wholly disabled due to the existence of such an overload condition.

An exemplary embodiment of the invention achieves the foregoing objects in a control system for a vehicle of the type mentioned and having a load handling means movable with respect to the vehicle frame. The control system includes a means for selectively operating the load handling means, a means for sensing an overload condition of the vehicle, a first means responsive to sensing means for disabling the operating means for a predetermined overload condition of the vehicle and a second means responsive to the sensing means for providing a perceptible indication that the predetermined overload condition is being approached and before the first means disables the operating means.

In a highly preferred embodiment, the sensing means comprises a single sensor.

In one embodiment, the means for providing a perceptible indication is operative to intermittently and repetitively provide the same. The indication, according to the invention, may be in the form of one or more of an audible warning, a visual warning, a decrease in the rate at which the load handling means may be operated, or a decrease in the rate of speed at which the vehicle may travel over the underlying terrain.

Where an audio and/or visual warning is utilized, it is preferred that the warning devices be driven by an oscillator to provide the intermittent and repetitive indication.

In a highly preferred embodiment, the oscillator is a variable frequency oscillator and means are provided for increasing the frequency of the oscillator, and thus the intermittent indication, as the undesired overload condition is more closely approached.

The invention also contemplates provision of unique, electrical circuitry for accomplishing the foregoing functions in simple and economic ways.

Other objects and advantages will become apparent from the following specification taken in connection with the accompanying drawings.

DESCRIPTION OF THE PREFERRED EMBODIMENTS

Figure 1:
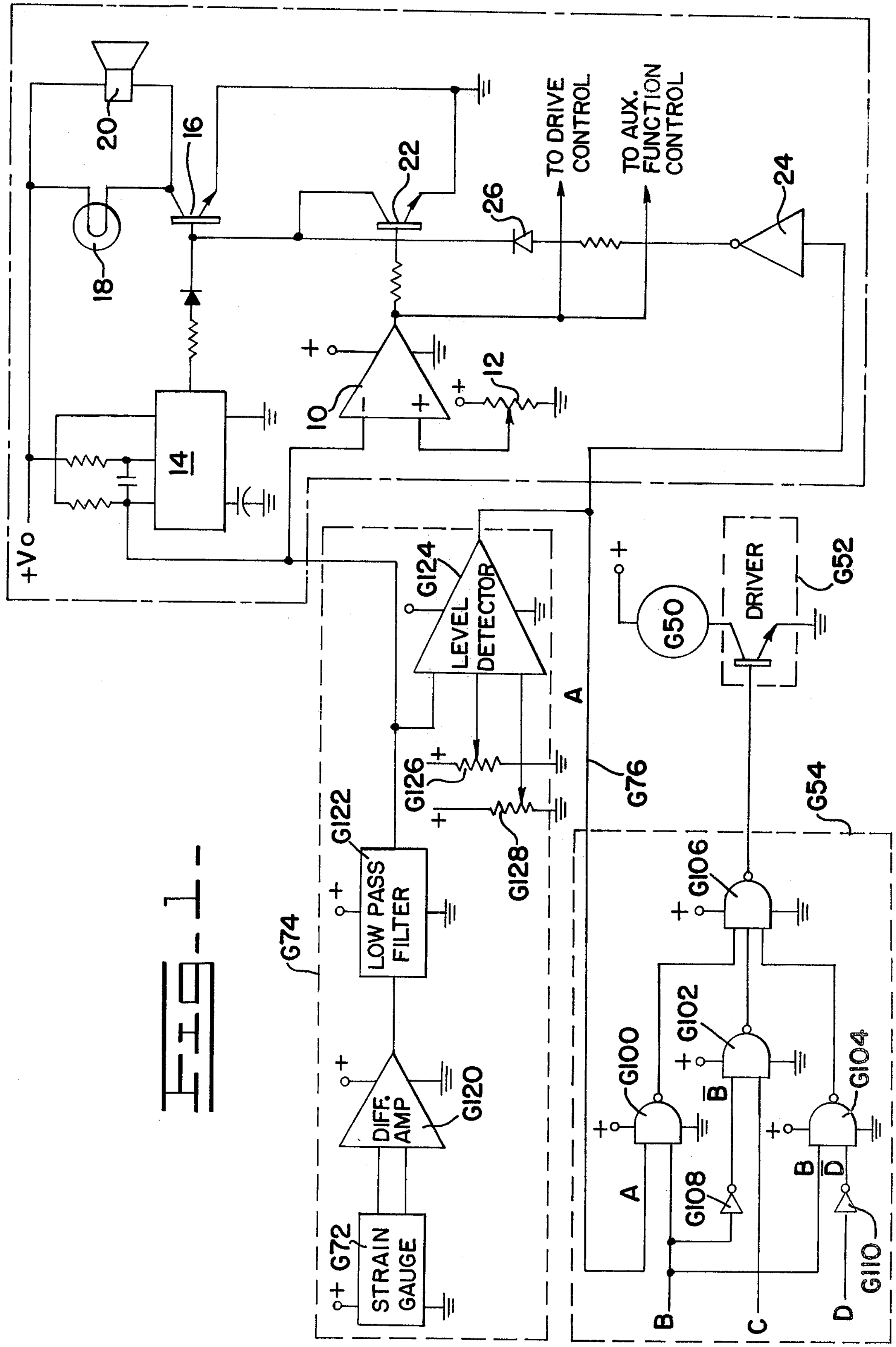
FIG. 1 is a schematic illustrating the application of that part of the invention which provides an audible and visual warning in advance of the predetermined overload condition to the prior art sensing system of Gregg et al, identified above.

An exemplary embodiment of a control system made according to the invention is illustrated in FIG. 1 in connection with a control system such as that described in the above-identified Gregg et al application, the entire disclosure of which is herein incorporated by reference. To simplify understanding of the present invention and its interrelationship to the Gregg et al system, the same reference numerals employed in the Gregg et al application are utilized herein for identical components, but are preceded by the letter "G".

As disclosed by Gregg et al, a strain gauge G72 may be interposed between the frame and the rear axle of the vehicle with which the system is to be used. The strain gauge G72 provides an electrical output signal which varies dependent upon the relative deflection of the frame and the rear axle of the vehicle which, of course, will vary according to the degree of loading of the load handling means at the front end of the vehicle. When the vehicle is unloaded, the center of gravity will be relatively rearwardly on the vehicle, resulting in one relative deflection condition. As loading on the front end of the vehicle is increased, the rear axle will be relatively unloaded as the center of gravity shifts forwardly, thereby providing an infinite variety of differing relative deflection characteristics.

The electrical output of the strain gauge G72, which is indicative of load distribution on the vehicle, is fed to a differential amplifier G120 and in turn to a low pass filter G122. As disclosed by Gregg et al, the low pass filter G122 permits only relatively low frequency signals to pass, which signals are indicative of the load distribution while precluding the passing of high frequency signals, which may be indicative of vibration caused by vehicle movement over the underlying terrain.

The output from the low pass filter G122 is fed to a level detector G124 which receives set point information from potentiometers G126 and G128. When a predetermined overload condition exists, as determined by the setting of potentiometers G126 and G128, the level detector G124 will issue a signal to a matrix of gates including gates G100, G102, G104, G106 and inverters G108 and G110, the precise operation of which is described more fully in the Gregg et al application. It is sufficient to note that when the predetermined overload condition signal is issued by the level detector G124, the gate G106 will issue a signal to a driver G52, to disable and prevent energization of a contactor coil G50 for the source of motive power for the vehicle, usually a hydraulic pump, if the operator of the vehicle should attempt any control operation which would aggravate the overload condition. On the other hand, as more fully explained by Gregg et al, even when the overload condition is sensed and applied to the gating matrix, certain operations will be allowed, which operations are only those which allow the removal of the predetermined overload condition.

The present invention includes an additional level detector 10 having a first input from a potentiometer 12 and a second input connected to the output of the low pass filter G122. The potentiometer 12 is set so that the level detector 10 will issue an output signal at some point as the predetermined overload condition is approached, but not attained. For the polarities indicated, the output signal of the additional level detector 10 will be of low or zero magnitude when the predetermined overload condition is being approached.

An oscillator 14 which is the voltage controlled, variable frequency type, also receives an input from the low pass filter G122. The oscillator 14 is of conventional construction and will provide an output of increasing frequency as the voltage of the input signal is changed. In the drawing, the frequency of the oscillator 14 will increase as forward loading of the vehicle, as detected by the strain gauge G72, is increased.

The output of the oscillator 14 is connected to the base of a transistor 16 having its collector coupled in parallel to a warning light 18 and a warning horn 20. Consequently, when the transistor 16 is caused to conduct by the output of the oscillator 14, the light 18 will flash and the horn 20 will sound repetitively and intermittently at the frequency of the output signal of the oscillator 14. As the overload condition is more closely approached, the frequency of the intermittent and repetitive operation of the light 18 and horn 20 will progressively increase.

The output of the additional level detector 10 is connected to the base of a transistor 22 which has its collector connected to the base of the transistor 16 and its emitter connected to ground. As a consequence of the polarities used, whenever the loading of the vehicle is not such that the overload condition is being approached, the transistor 22 will conduct and clamp the base of the transistor 16 to ground, preventing energization of the light 18 and the horn 20. Conversely, when the overload condition is being approached, as sensed by the additional level detector 10, the transistor 22 will be shut off thereby allowing the light 18 and the horn 20 to be driven at the frequency of the output signal of the oscillator 14.

An inverter 24 is connected to the output of the level detector 124 through an isolating diode 26 to the base of the transistor 16. It will be recalled that when the predetermined overload condition exists, the level detector 124 will provide a signal indicative of that fact and such a signal is inverted and placed on the base of the transistor 16 to continuously cause the same to conduct regardless of the frequency of the oscillator 14 when the predetermined overload condition exists.

As a result of the foregoing, an operator of the vehicle is warned, at a low intensity, when an overload condition is first being approached by the low frequency, intermittent operation of the light 18 and the horn 20. If the operator persists in further aggravating the situation, he will be warned of that fact by an increase in frequency of the operation of the light 18 and the horn 20. In the event the operator persists so that the predetermined overload condition exists, the gates, as described by Gregg et al, will disable components of the control system that would allow further aggravation. In addition, the circuit including the inverter 24 will continuously energize the light 18 and the horn 20 to indicate to the operator that the overload condition should be relieved.

Figure 2:
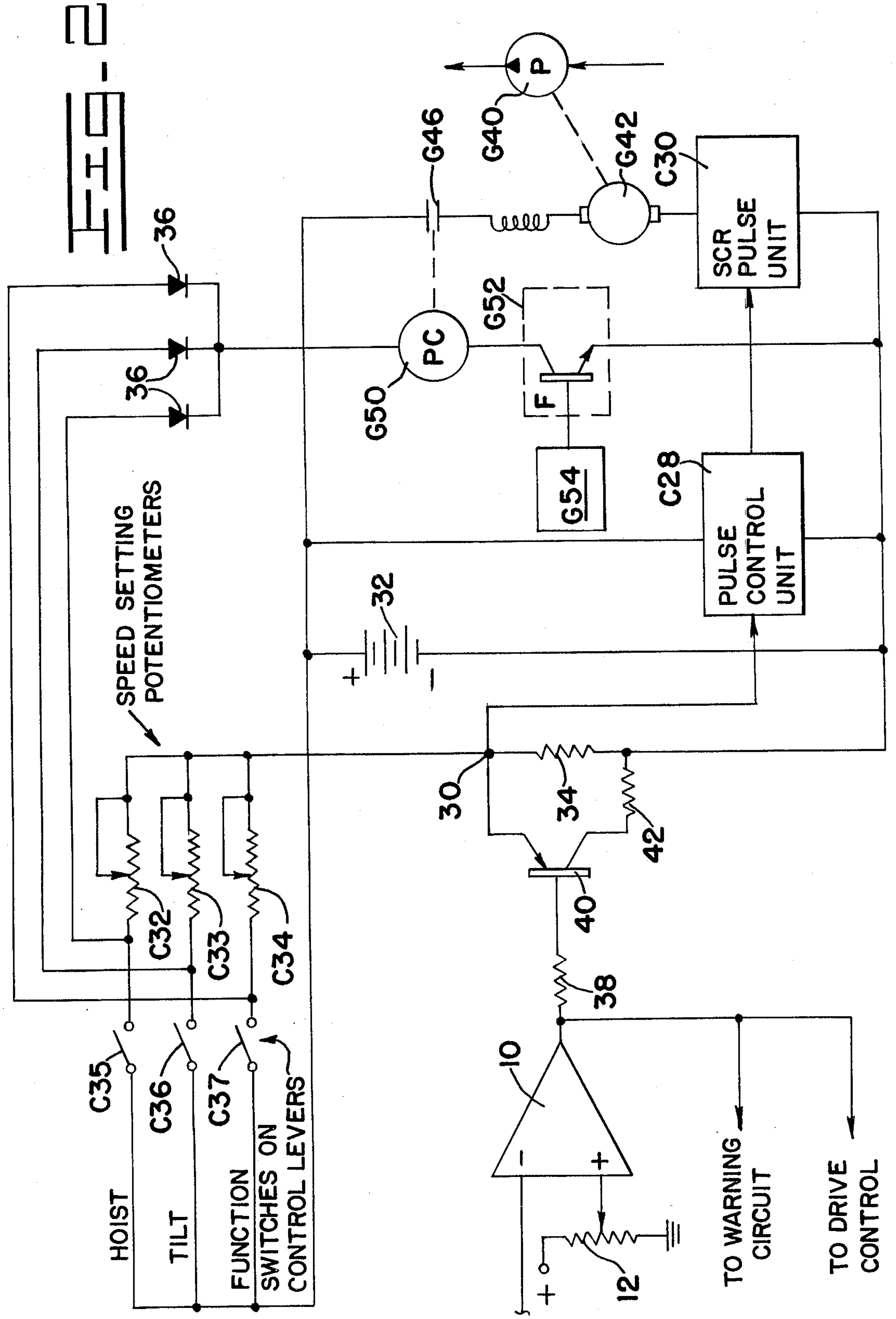
FIG. 2 is a schematic illustrating the application of the invention to a system wherein speeds of various auxiliary functions of the work-performing means are regulated as that disclosed in the above-identified Climax Coventry patent specification.

FIG. 2 illustrates the present invention and its use in controlling the rate at which auxiliary functions performed in such vehicles as, for example, hoist and tilt can be controlled when an overload condition is being approached to provide a perceptible indication of that fact. The system of the present invention is used in conjunction with a speed control system of the type disclosed in the previously identified Coventry Climax patent, the disclosure of which is incorporated herein by reference. For simplicity and for understanding, the components illustrated in FIG. 2 common to that of the previously identified Gregg et al or Coventry Climax patent are identified by the same reference numerals but preceded by a "G" or a "C", respectively.

As disclosed in the previously identified patents or patent applications, a supply pump G40 is utilized for providing hydraulic fluid under pressure to cylinders which perform hoist, tilt, and possibly other functions. The pump G40 may be driven by a variable speed DC motor G42 and its speed is controlled by a silicon controlled rectifier or thyristor pulse unit C30.

As is well known, the unit C30 is operative to conduct intermittently and provide pulses, of variable width, to the motor 42. The width of the pulses passing to the motor G42 through the unit C30 is controlled by a pulse control unit C28 of conventional construction and which is responsive to the voltage of an input signal such that the higher the voltage of the input signal, ultimately, the faster the motor G42 will drive the pump G40.

The input of the pulse control unit C28 is connected to a junction 30 which is common to each of a plurality of potentiometers C32, C33, and C34. The potentiometers C32 and C33 are adapted to be preset to determine the speed of the pump for hoist and tilt functions respectively, while the potentiometer C34 may be preset to control the speed of a third function such as, for example, a reach function, if used.

Function selection switches C35, C36 and C37 are connected in series with respective ones of the potentiometers C32-C34 and generally will be tied into valves controlling the flow of hydraulic fluid from the pump G40 to the appropriate hydraulic cylinders.

Oppositely of the potentiometers C32–C34, the junction 30 is connected to one side of a battery 32 via a resistor 34. The opposite side of the battery 32 is connected into the circuit via the switches C35–C37.

Thus, the selected one or ones of the potentiometers C32–C34 and the resistor 34 act as a voltage divider to set the magnitude of the voltage input to the pulse control unit C28.

To cause energization of the motor G42 to energize the pump G40, the common junctions of the switches C35–C37 and the potentiometer C32–C34 are tied to isolating diodes 36 through the pump contactor coil G50 so that upon any one of the switches C35–C37 being closed, the pump contactor coil G50 will be enabled, providing, however, the driver G52 is conducting.

The output of the additional level detector 10 is connected through a current limiting resistor 38 to the base of a transistor 40 which has its collector-emitter circuit connected in series with a resistor 42. The series combination of the transistor 40 and the resistor 42 is connected in parallel with the resistor 34.

For the polarities mentioned previously, the transistor 40 will be normally nonconducting with the result that the speed at which the functions of hoist, tilt, etc., are conducted will be determined only by the value of the resistor 34 and the settings on the selected one or ones of the potentiometers C32–C34. However, when the additional level detector 10 determines that the predetermined overload condition is being approached, and its output drops to a low magnitude, the transistor 40 will begin conducting, thereby placing the resistor 42 in parallel with the resistor 34. Consequently, the voltage level at the junction 30 will drop and a lower voltage will be provided to the pulse control unit C28 thereby ultimately causing the speed of the pump G40 to be decreased and accordingly decreasing the speed at which the selected function or functions can be performed. Such a decrease in speed provides a perceptible indication to the operator of the vehicle that the predetermined overload condition is being approached and further allows safer operation since the inertia of the load being handled is decreased with the speed of the function.

While the switching system, including the level detector 10, the transistor 40, and the resistor 42, have been illustrated in a configuration whereby retardation of all functions performed will occur upon the predetermined overload condition being approached, those skilled in the art will recognize that if, for a given vehicle of the type of concern, only one or two of the functions are considered to be critical with respect to overload conditions, a similar resistor-transistor configuration controlled by the additional level detector 10 could be employed in series with any given one or more of the potentiometers C32–C34. For example, the foregoing could be achieved through the use of a fixed value resistor in series with the desired potentiometer utilizing a normally conducting transistor connected in shunt relation to the fixed value resistor. The change in the signal from the level detector 10 from a high value to a low value indicative of the approaching of the predetermined overload condition would then shut off the transistor to remove the shunt relation thereby placing the fixed value resistor in the circuit and lowering the voltage at the junction 30.

Figure 3:
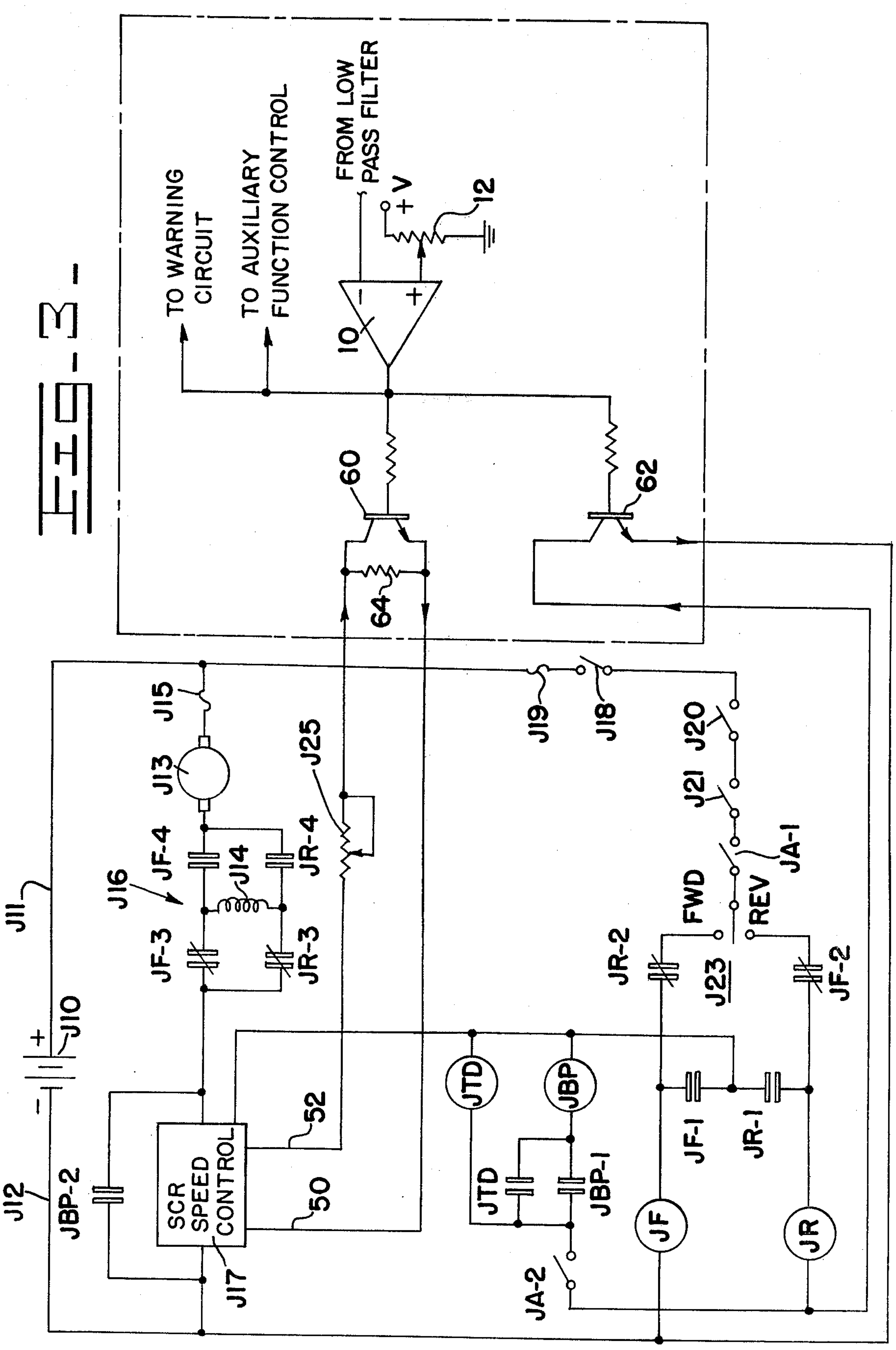
FIG. 3 is a schematic illustrating the application of the invention to a vehicle speed control system, to retard the speed at which the vehicle may move, the speed control system being along the lines of that disclosed in the above-identified Jones patent.

Turning now to FIG. 3, the application of the present invention to the speed control system for the vehicle is illustrated. The speed control system shown is essentially that disclosed in the above-identified Jones patent, the disclosure of which is incorporated by reference, and where components are illustrated in FIG. 3 that are identical to those disclosed by Jones, they are given the same reference numerals but preceded by a "J".

The vehicle will typically include, a DC, series-wound drive motor having an armature J13 and a field J14. Speed is controlled by a silicon controlled rectifier speed control J17 which may include a pulse control unit along the lines of the pulse control unit C28 for controlling speed according to the voltage differential across lines 50 and 52.

The system includes a forward relay coil JF and a reverse relay coil JR, the former operating the contacts illustrated preceding by a JF designation and the latter operating the relay contacts preceded by a JR designation. In each case, the contacts are illustrated in their normal conditions, that is, the conditions in which they will be when the respective ones of the coils JF and JR are de-energized.

The system also includes a key operated switch J18 in series with a seat operated switch J20, a hand brake operated switch J21 and an initial acceleration switch JA-1. Finally, there is a forward and reverse switch J23.

In order to energize either of the relay coils JF and JR, the key switch must be closed in the usual fashion, an operator must be sitting on the seat to close the switch J20, the hand brake must be released to allow the switch J21 to be closed, and an accelerator pedal or the like must be contacted by the operator to close the initial acceleration switch JA-1. In addition, the direction selecting switch J23 must be closed through either the forward or the reverse contact.

Those skilled in the art will recognize that when all of such occurs, one or the other of the coils JF and JR will be energized and the corresponding contacts will shift from the condition shown. The contacts also provide a lockout function to prevent improper energization of the field J14, etc.

The system further includes a time delay relay JTD and normally open contacts similarly designated, along with a bypass relay coil JBP and two sets of normally open contacts operated thereby as indicated.

A final acceleration switch JA-2 is connected to one side of the contacts JTD and JBP-1 oppositely from the coils JTD and JBP and will be closed when the accelerator is fully depressed, indicating a maximum speed condition. This, assuming power is supplied to the switch JA-2, will cause energization of the time delay relay JTD and its associated contacts will close after a predetermined period to energize the bypass relay JBP. When that occurs, the contacts JBP-1 will close to lock in the relay JBP and the contacts JBP-2 will close to bypass the speed control J17 to provide full power to the drive motor.

In between initial and final acceleration characteristics, speed is controlled by an accelerator potentiometer J25 connected in the lines 50 and 52. The setting of the accelerator potentiometer J25 will determine the voltage applied to the speed control J17 and thus the output speed.

According to the present invention, the output of the additional level detector 10 is connected to the base of transistors 60 and 62 through current limiting resistors. The transistor 60 has its base-emitter circuit connected in series with the accelerator potentiometer J25 in the lines 50 and 52 and a resistor 64 is connected in shunt relation across the emitter and collector of the transistor 60. The transistor 62 has its emitter connected to one side of the vehicle battery J10 and its collector connected to the final acceleration switch JA-2 and the reverse relay JR.

For the polarities mentioned previously, the transistor 60 and the transistor 62 will be conducting whenever the predetermined overload condition is not approached, that is, whenever the output of the additional level detector 10 is at its relatively high magnitude. Consequently, the various functions performed by the system as described by Jones can occur with the speed of the drive motor being controlled by the setting of the accelerator potentiometer J25. However, should the predetermined overload condition be approached, as mentioned earlier, the output of the additional level detector 10 will go to its relatively low magnitude, thereby switching the transistors 60 and 62 off.

As a consequence of the foregoing, the resistor 64 will no longer be shunted by the transistor 60 and its value will be placed in series with that of the accelerator potentiometer J25 to thereby increase the voltage drop and thereby retard the speed of the drive motor, preferably to the extent that the vehicle can only creep. At the same time, the switching off the transistor 62 will break the circuit from the battery J10 to the reverse relay JR and to the final acceleration switch JA-2. In the case of the former, the operator of the vehicle is prevented from reversing the vehicle's direction which might give rise to an undesirable overload condition due to inertia forces. At the same time, the cutoff of power to the final acceleration switch JA-2 prevents energization of the bypass coil JBP if the switch JA-2 is closed, thereby preventing closure of contacts JBP-2 and abrupt acceleration of motor armature J13 due to across-the-line operation and the speed control J17 remains in the system so that the resistor 64 will be operative to decrease the speed of the motor.

Of course, the reduction in speed of the vehicle provides a perceptible indication to the operator that the predetermined overload condition is being approached to enable him to terminate other functions such as lift, tilt, etc., which could aggravate the overload condition, before the pump for the cylinders which perform the auxiliary functions is disabled by the circuitry illustrated in FIG. 1.

From the foregoing, it will be appreciated that a control system made according to the invention provides positive control over auxiliary functions customarily performed in vehicles such as lift trucks, front end loaders, or the like, by disabling the components that provide such functions when a predetermined overload condition exists. It will also be appreciated that the system anticipates an overload condition and warns the operator of the vehicle that an overload condition is being approached to allow the operator to take positive action and prevent further aggravation of the condition and relieve it to prevent such shutdown.

The embodiments of the invention in which an exclusive property or privilege is claimed are defined as follows:

1. A control system for a work performing vehicle having a load-handling means movable with respect to the vehicle frame, comprising:
- means for selectively operating said load-handling means;
- means for sensing the loading condition of the vehicle, said sensing means providing a signal of variable magnitude proportional to the degree of said loading;
- first means receiving said signal and responsive to one magnitude thereof for disabling said operating means for a predetermined overload condition of the vehicle; and
- second means receiving said signal and responsive to another, different magnitude thereof for intermittently and repetitively providing an indication perceptible to the operator of the vehicle that said predetermined overload condition is being approached before said first means disables said operating means, said second means including means for increasing the frequency at which said perceptible indication is provided as said predetermined overload condition is more closely approached, and means for continuously providing said perceptible indication when said predetermined overload condition is reached.

2. The control system of claim 1 wherein said sensing means comprises a single sensor.

3. The control system of claim 1 wherein said second means comprises a light source for providing said perceptible indication.

4. The control system of claim 1 wherein said second means comprises a sound generator for providing said perceptible indication.

5. A control system for a work performing vehicle having a load-handling means movable with respect to the vehicle frame, comprising:
- means for selectively operating said load-handling means;
- sensor means for sensing the degree of an overload condition of the vehicle and for providing an electrical signal having a characteristic proportional to the degree of overload;

first means receiving said signal and responsive to a predetermined magnitude representative of a predetermined degree of overload for disabling said operating means;

second means receiving said electrical signal and responsive to a magnitude different from said predetermined magnitude and representative of a lesser degree of overload than said predetermined degree of overload for providing an output signal; and means comprising an electrical signaling device responsive to said electrical output signal for providing an indication perceptible to the operator of the vehicle that said predetermined degree of overload is being approached, said indication providing means including a variable frequency oscillator for intermittently driving said electrical signaling device, said variable frequency oscillator having an input for receiving said electrical signal and including means for changing the frequency of oscillation responsive to a change in the magnitude of said electrical signal, said indication providing means including means preventing the provision of said perceptible indication except when said lesser degree of overload condition exists; and means for continuously driving said signaling device when said predetermined degree of overload is sensed.

6. A control system for a work performing vehicle having a load-handling means movable with respect to the vehicle frame, comprising:

means for selectively operating said load-handling means;

sensor means for sensing the degree of an overload condition of the vehicle and for providing an electrical signal having a characteristic proportional to the degree of overload;

first means receiving said signal and responsive to a predetermined magnitude representative of a predetermined degree of overload for disabling said operating means;

an electrical signaling device for providing a perceptible indication;

a variable frequency oscillator for intermittently driving said signaling device, said oscillator including means responsive to the magnitude of said electrical signal for changing the frequency of oscillation;

a level sensor receiving said electrical signal and responsive to a magnitude thereof different than said predetermined magnitude and representative of a lesser degree of overload than said predetermined degree for providing an output signal; and means responsive to said output signal for connecting said oscillator to said signaling device whereby said perceptible indication is provided only for degrees of overload above said lesser degree to indicate that said predetermined degree of overload is being approached.

* * * * *